United States Patent
Scholz et al.

(10) Patent No.: US 9,348,555 B2
(45) Date of Patent: May 24, 2016

(54) IN-VEHICLE ACCESS OF MOBILE DEVICE FUNCTIONS

(71) Applicants: VOLKSWAGEN AG, Wolfsburg (DE); AUDI AG, Ingolstadt (DE)

(72) Inventors: Lars Scholz, Belmont, CA (US); Mark Beckmann, Braunschweig (DE); Patrick Bartsch, Wolfsburg (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 13/834,593

(22) Filed: Mar. 15, 2013

(65) Prior Publication Data

US 2014/0277937 A1    Sep. 18, 2014

(51) Int. Cl.
- *G06F 7/00* (2006.01)
- *H04L 29/08* (2006.01)
- *H04W 4/00* (2009.01)
- *H04W 4/04* (2009.01)

(52) U.S. Cl.
CPC ............ *G06F 7/00* (2013.01); *H04L 67/025* (2013.01); *H04W 4/001* (2013.01); *H04W 4/04* (2013.01)

(58) Field of Classification Search
None
See application file for complete search history.

(56) References Cited

U.S. PATENT DOCUMENTS

| | | | |
|---|---|---|---|
| 8,799,360 B2 * | 8/2014 | Nicholson et al. | 701/36 |
| 2004/0214526 A1 * | 10/2004 | Tajima et al. | 455/41.2 |
| 2009/0165049 A1 * | 6/2009 | Sekiguchi | H04H 60/51 725/39 |
| 2012/0065815 A1 * | 3/2012 | Hess | 701/2 |
| 2012/0179325 A1 * | 7/2012 | Faenger | 701/31.4 |
| 2012/0324482 A1 | 12/2012 | Park | |
| 2013/0143546 A1 * | 6/2013 | Ricci | H04L 67/02 455/420 |
| 2013/0335320 A1 * | 12/2013 | Mori et al. | 345/156 |
| 2015/0031350 A1 * | 1/2015 | Haggett | H04L 67/08 455/419 |
| 2015/0094949 A1 * | 4/2015 | Kato | G01C 21/3688 701/410 |

FOREIGN PATENT DOCUMENTS

| | | |
|---|---|---|
| DE | 102011017332 A1 | 10/2012 |
| DE | 102011120249 A1 | 6/2013 |
| WO | 2012143073 A1 | 10/2012 |

OTHER PUBLICATIONS

W3 Schools, HTML5 Introduction, Feb. 9, 2012, Wayback Machine Archive of www.w3schools.com/html5/html5_intro.asp.*
Tali Garsiel and Paul Irish; How Browsers Work: Behind the scenes of modern web browsers; Aug. 5, 2011, http://www.html5rocks.com/en/tutorials/internals/howbrowserswork/.*
Christina Warren; How HTML5 is Aiding in Cross-Platform Development; Feb. 22, 2011, http://mashable.com/2011/02/22/html-mobile-development/.*
Harman; Personalize Your Car; Jan. 3, 2012, http://www.harman.com/EN-US/Newscenter/Documents/HARMAN_TECH%20BOOKLET_010312_Fin.pdf.*
Bridgwater; QNX Navigates Towards HTML5 In-Car Apps; downloaded from http://www.drdobbs.com/mobile/qnx-navigates-towards-html5-in-car-apps/232400118; downloaded Jun. 19, 2013.

(Continued)

*Primary Examiner* — Rami Khatib
*Assistant Examiner* — David Merlino
(74) *Attorney, Agent, or Firm* — Barnes & Thornburg LLP

(57) ABSTRACT

In-vehicle access of mobile device functions is provided wherein a vehicle is coupled to the mobile device, and obtains a list of apps installed thereon. A user manipulates vehicle controls to operate a select app and the vehicle modifies its display based on the app.

16 Claims, 5 Drawing Sheets

(56) References Cited

OTHER PUBLICATIONS

Cheng; HTML5 and Device APIs for Automotive: Is it time to power Infotainment and Car Portal Applications with Web Technologies?; Web and Automotive: Shift into High Gear on the Web; W3C Workshop; Oct. 2012; downloaded from http://www.w3.org/2012/11/web-and-automotive/submissions/webautomotive1_submission_4.pdf; downloaded Jun. 19, 2013.

Engdahl; Tomi Engdahl's ePanorama blog; Archive for the HTML5 Category; HTML5 for HMI; downloaded from http://www.epanorama.net/blog/category/html5/; downloaded Jun. 19, 2013.

Gryc; QNX Auto Blog; Everything you wanted to know about HTML5 in the car, Part II; downloaded from http://qnxauto.blogspot.com/2012/everything-you-wanted-to-know-about_22.html; downloaded Jun. 19, 2013.

Johnson; HTML5 for automotive infotainment: What, why, and how?; 2012 AT&T Developer Summit; Jan. 8-9, 2012; downloaded from http://developer.att.com/home/community/conference/HTML5_for_Infotainment.pdf; downloaded Jun. 19, 2013.

Moon; QNX Auto Blog; downloaded from http://qnxauto.blogspot.com/; downloaded Jun. 19, 2013.

Bose et al.; Terminal Mode—Transforming Mobile Devices into Automotive Application Platforms; Proceedings of the Second International Conference on Automotive User Interfaces and Interactive Vehicular Applications (AutomotiveUI 2010); Nov. 11-12, 2010; pp. 148-155;.

Eichhorn et al.; A Flexible In-Vehicle HMI Architecture based on Web Technologies; Proceedings of the 2nd International Workshop on Multimodal Interfaces for Automotive Applications (MIAA '10); pp. 9-12; Feb. 7, 2010.

Kirk; Connected Vehicles: An Executive Overview of the Status and Trends; Globis Consulting Inc.; Nov. 21, 2011; downloaded from http://www.globisconsulting.ca/Connected_Vehicles_Globis_rpt.pdf.

Search Report for International Patent Application No. PCT/EP2014/053218; Jul. 1, 2014.

\* cited by examiner

```
<!DOCTYPE html>
<html>
<head>
<link rel="stylesheet" type="text/css" h=ref="css/brand.css"/>
<script type="text/javascript" src="brand.js"
</head>
<body></body>
</html>
```

FIG. 4A

```
<!DOCTYPE html>
<html>
<head>
<link rel="stylesheet" type="text/css" h=ref="css/brand.css"/>
<link rel="stylesheet" type="text/css" h=ref="css/app.css"/>
<script type="text/javascript" src="brand.js"
<script type="text/javascript" src="app.js"
</head>
<body></body>
</html>
```

FIG. 4B

IN-VEHICLE ACCESS OF MOBILE DEVICE FUNCTIONS

BACKGROUND

The present disclosure relates to a system, components and methodologies for improved in-vehicle access of mobile device functions. In particular, the present disclosure is directed to a system, components and methodologies that enable improved in-vehicle access of mobile device functions that include an in-vehicle user control, a display device, and a transceiver to communicate with a mobile communication terminal (UE).

SUMMARY

According to the present disclosure, improved in-vehicle access of mobile device functions is provided. A vehicle is coupled to the mobile device, and displays a list of apps installed thereon. A user manipulates vehicle controls to affect the operation of one of the apps. The vehicle modifies its graphical display based on the app.

In illustrative embodiments, a system for in-vehicle access of mobile device functions may include an in-vehicle user control, a display device, and a transceiver to communicate with a mobile communication terminal (UE). The vehicle may have a protocol stack (stack) operative to control a function of the UE responsive to a manipulation of the user control, and a browser application that can render user interface code and present a GUI on the vehicle display based on the code. The vehicle may request and receive a list of apps installed on the UE and, responsive to a manipulation of the user control, cause a select app to perform an operation.

In illustrative embodiments, a method for in-vehicle accessing of mobile device functions may include coupling a vehicle to a UE via a transceiver; obtaining by the vehicle a list of apps installed on the UE, storing the list in a memory of the vehicle, and presenting the list in a GUI on a display of the vehicle. The UE may launch a web server, and the vehicle may launch a browser application. Responsive to a user manipulation of a vehicle control, a select app may perform an operation. User interface code may be provided to the browser, which presents a GUI based on the code. The vehicle may use a stored Cascading Style Sheet in presenting the GUI, and may execute JavaScript to implement app functionality.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIGS. 4A and 4B contain exemplary HTML code in accordance with the disclosure.

DETAILED DESCRIPTION

Figure 1A:
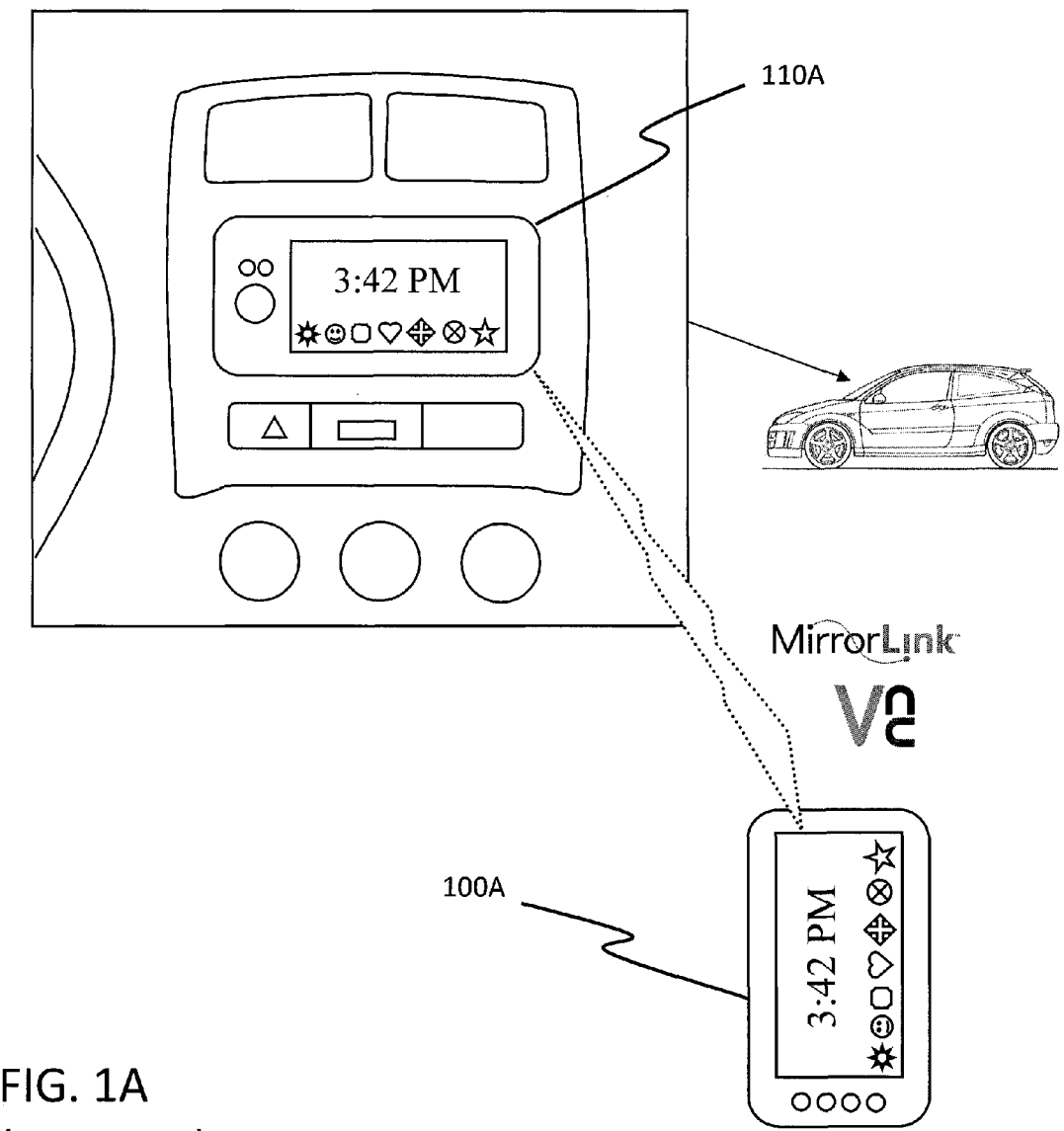
FIG. 1A illustrates a prior art arrangement of a vehicle head unit (HU) interacting with a user communication terminal (UE).

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Use of mobile communications devices such as smartphones and the like has become very common, and people spend a great deal of time accessing applications ("apps") on their mobile communication devices. A mobile communication device may be referred to herein as a "smartphone" or "user equipment" (UE), although the herein disclosed apparatus, systems, and methods may be applied to other mobile communication and/or computing devices as well.

However, drivers sometimes become distracted, and reckless as a result of using such mobile devices while driving, for example to get directions, to receive email, to stay connected to a social network, etc. It has been found that such usage while driving can be distracting and therefore is potentially dangerous. Consequently, many states have banned texting while driving, and further state and federal laws and regulations may be implemented in the future to control the use of smartphones and the like while driving.

One conventional way to make using a UE in a vehicle less distracting is to implement a way to enable the user to interact with the UE by using control means provided in a vehicle. At least one such solution is available in the prior art called MirrorLink™. MirrorLink is a device interoperability standard promulgated by the Car Connectivity Consortium (CCC), an organization comprising various automobile and electronic device manufacturers. The CCC establishes standards for certifying apps and devices as safe to use while driving. In particular, certified compliance with the MirrorLink standard enables a UE and a vehicle's so-called In-Vehicle Infotainment (IVI) system, including a "head unit" (HU), to intercommunicate and cooperate. Thereby, MirrorLink turns a smartphone or the like into an application platform that can be used in vehicles, in which apps can be hosted and run on the smartphone while vehicle occupants interact with the apps through controls that are part of the vehicle. Such controls are commonly located on a steering wheel, dashboard buttons, and/or a touch screen of the vehicle's IVI system, for example, and are already designed to be safe to operate while driving.

MirrorLink employs a set of well-established, non-proprietary technologies including Internet Protocol (IP), Universal Serial Bus (USB), WiFi wireless local area network (WLAN), Bluetooth, Real-Time Protocol (RTP, for audio) and Universal Plug and Play (UPnP). In addition, MirrorLink uses the Virtual Network Computing (VNC) system as a baseline protocol to display the user interface of smartphone apps on the vehicle's IVI system display, and to communicate user input in the form of manipulation of vehicle controls back to the smartphone. VNC transmits the operation of vehicle control events from the vehicle to the smartphone, and relays graphical user interface (GUI) updates from the smartphone to the vehicle. The vehicle and the smartphone communicate over a communication link that may be wired or wireless. Thereby, the user has access to his/her smartphone apps while driving.

The consumer electronics (CE) industry uses well-defined mobile app development platforms and frameworks (e.g., Android, iOS, Windows Mobile, HTML5, cascading style sheets (CSSs), JavaScript (JS), etc.) to develop mobile apps as efficiently as is practicable.

However, development of devices and apps for use in an automotive environment entails additional vehicle-specific requirements. For example, with regard to hardware, one must consider the temperature range of the operating environment, device robustness, etc. And with regard to software apps, in contrast to other computing environments in which full user engagement is often desirable, one must consider mitigating the potential for driver distraction, for example. Consequently, development of apps for in-vehicle environments may incur longer development cycles than application development for other computing environments. Vehicle infotainment platform architectures should therefore be able to satisfy such automotive-specific requirements, and optionally web adaptability and extensibility as well.

In addition, an app on a user's smartphone may need access to a vehicle's Controller Area Network (CAN) to obtain vehicle data, such as vehicle speed, fuel consumption, distance travelled, time of vehicle operation, etc. Such data may be displayed on a vehicle display, for example in the dashboard, and may also be shared with the smartphone app.

Various conventional mechanisms are available whereby a smartphone and a vehicle can intercommunicate and cooperate. One mechanism is to present a copy of the smartphone display on an IVI display. The MirrorLink™ specification includes such a mechanism. In particular, the MirrorLink protocol stack uses the Virtual Network Computing (VNC) system to reproduce the contents of a smartphone display on a cooperating vehicle's head unit (HU) display. VNC essentially sends the entire smartphone display contents, pixel by pixel, to the HU display, several times per second. The MirrorLink specifications are available at http://www.mirrorlink.com, and are included herein by reference in their entirety, up to and including the most recent versions available as of the filing date of the present application, and in particular including version 1.1.

Another prior art mechanism used to integrate smartphone apps with a car's IVI system involves incorporating a third party application programming interface (API) into the IVI system program code. The smartphone app then calls the IVI system API to access IVI resources.

Yet another mechanism used to integrate smartphone functions with an IVI system involves controlling and operating the smartphone using vehicle controls, i.e., remote control of the smartphone and its apps.

Finally, the smartphone itself may simply be mounted in a cradle or the like that makes it conveniently accessible to the user while driving. The cradle may, for example, provide a power source to keep the smartphone charged when docked.

However, each of these conventional mechanisms providing integration between a mobile device and its constituent functionality and a vehicle specific system still suffer from various shortcomings as explained herein. These shortcomings are addressed and resolved by the technical solution of the disclosed embodiments.

The herein disclosed devices, systems, and methods enable a user communication terminal ("user equipment", or UE), such as a smartphone or the like, to function cooperatively with a vehicle infotainment system or head unit (HU). As used herein, the term UE can refer to an Apple™ iPhone™, a mobile smartphone that uses an Android™ or other operating system, or any of various other mobile computing devices that may or may not include mobile telephone functionality. Examples can include a personal digital assistant (PDA), a tablet computer, netbook computer, laptop computer, media viewer, or other computing resource containing at least a tangible computing processor and a data storage device such as a static or dynamic memory, magnetic or optical disc drive, or the like.

FIG. 1A illustrates a prior art arrangement in which a UE 100A and a vehicle infotainment center 110A ("head unit", or HU) cooperate. As shown, the UE and the HU communicate using a standard called MirrorLink, which uses a graphical user interface (GUI) sharing system called Virtual Network Computing (VNC). VNC uses the Remote Frame Buffer (RFB) protocol to transmit events which, in this context, pertain to a user manipulation of vehicle controls. The control events are transmitted from the vehicle to the UE. MirrorLink is also used to transmit screen updates from the UE to the HU for presentation on its display. The screen updates are conveyed to the HU pixel by pixel. This is apparent in the figure, wherein the HU display reproduces the image on the UE display.

However, the current MirrorLink standard (Version 1.1) based on VNC has some disadvantages. These include the fact that, because there is a very broad diversity of displays used in UEs, in many cases the resolutions and aspect ratios of the UE display and the HU display do not match. Consequently, very often either portions of the HU display are not covered by the device frame (i.e., when the HU display's horizontal and/or vertical pixel dimension is greater than that of the UE display), or the app appears cropped and pixilated (i.e., when the UE display has a greater pixel dimension than the HU display). In FIG. 1A, the two displays have the same pixel dimensions, so the UE display just fills the HU display. However, if that were not the case, the HU display may present one of the foregoing artifacts due to the mismatch.

Moreover, VNC copies the entire screen pixel by pixel, resulting in an enormous amount of data which must be transferred from the UE to the HU for each screen refresh, and the screen must be refreshed at least several times per second to give a good user experience. Tests using a Nokia UE with an 800×480 screen resolution coupled to an HU via wired Universal Serial Bus (USB) connection showed a transfer rate of less than 15 frames per second. All other things being equal, the trend of new UE models being introduced with higher and higher density displays will lead inexorably to a less than optimum user experience when screen access is based on VNC, because refreshing a high-density screen at a high frame rate, such as 30 frames per second (fps) for example, may require more communication bandwidth than is available.

Another challenge that exists in the prior art is that different vehicle brands generally have different User Interface (UI) guidelines for their infotainment systems. An app developer may have to build an entirely new app for every vehicle brand to be supported, resulting in either a large development cost, or a lesser number of vehicle brands than might otherwise be supported. Moreover, the look and feel of third-party apps running on the UE is controlled by the third-party developers, not by the vehicle manufacturers. So every time a new vehicle UI guideline is released, apps must be updated to match the new UI. Because this update is not controlled by the vehicle manufacturers, updates may not be completed in a timely fashion, or may not be completed at all.

The foregoing challenges can result in a poor user experience, and/or in a reduced number of apps that are compatible with Mirrorlink-enabled vehicles.

Disclosed embodiments provide a solution to the above-described technical problems for providing improved integration between mobile devices, their constituent functionality, and in-vehicle control and infotainment systems.

Disclosed embodiments offer a solution to this technical problem by sending user interface (UI) code to the HU to be rendered by a browser running on the HU, wherein the UE and the HU may both use the same interface code and syntax and semantics to render the UI code for presentation on a display, with the result that they both render the interface in the same way. In at least one disclosed embodiment, the UI code that is presented on the UE display may be the same UI code that is transmitted to the HU for presentation on the HU display; using this framework, app developers need not write any additional code for their apps to display properly on a display of a vehicle HU.

Figure 1B:
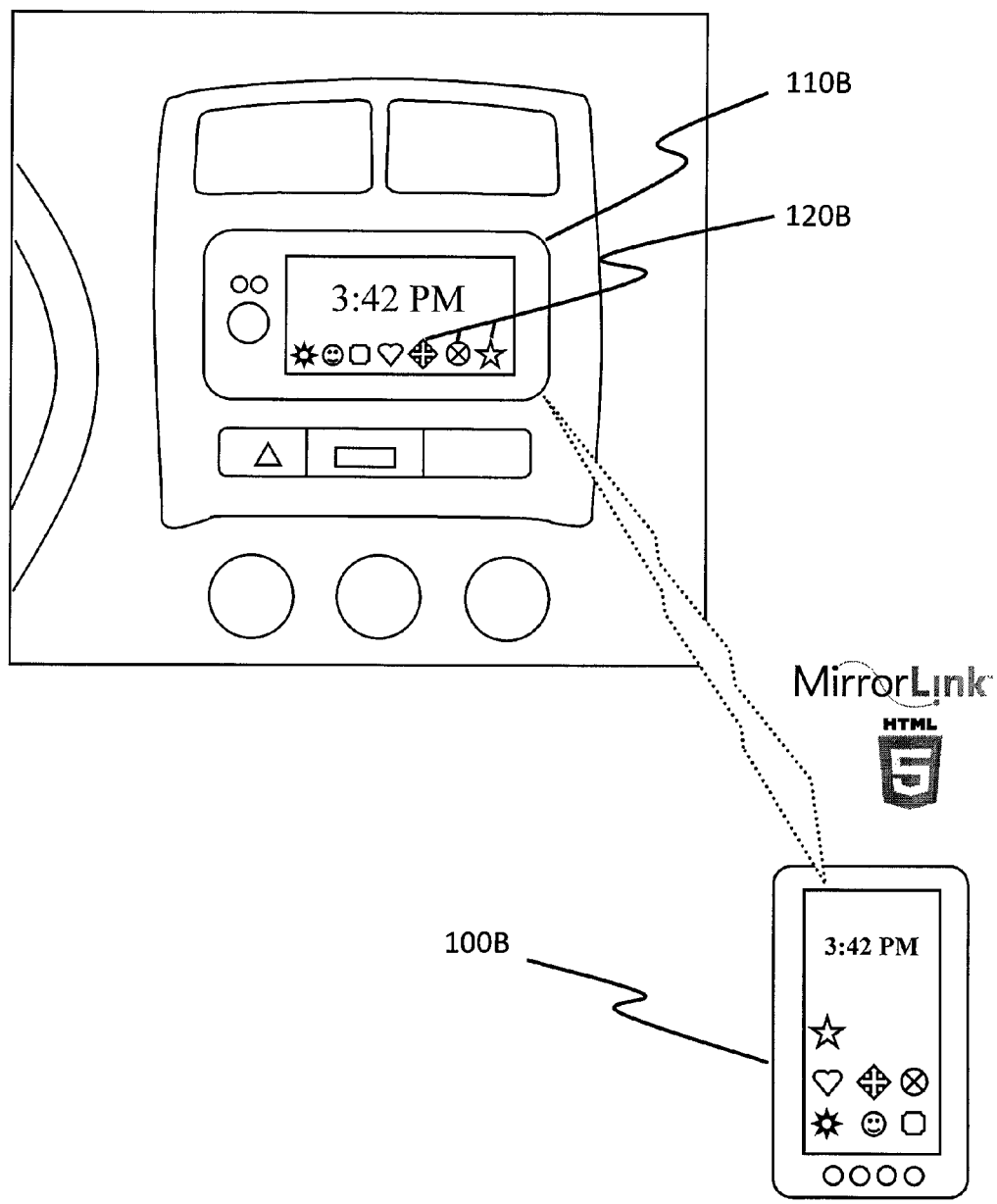
FIG. 1B illustrates an arrangement of a vehicle HU interacting with a UE in accordance with the disclosure.

Thus, disclosed embodiments enhance Mirrorlink with a markup language such as HTML5 that can be rendered by a browser application, which changes the situation markedly. As a result of this alteration, third-party apps may look better, because the appearance of the apps on the Head Unit (HU) or other vehicle display may be managed by the browser application to present the apps' interface correctly on the HU display regardless of its pixel dimensions, and without regard for any mismatch between the UE display and the HU display. This is illustrated in FIG. 1B, in which the image presented on the display of UE 100B is modified for presentation on the display of HU 110B by adapting the arrangement of the app icons to present properly on the HU display.

Further, software apps may perform better and be better integrated into the infotainment system. This is because instead of issuing new UI guidelines, the vehicle manufacturers can simply adapt the browser application to provide an updated look that is characteristic of their brands, and that is controlled by the manufacturers and not by the app developers. Accordingly, the app developers need not update their apps simply to conform to new UI guidelines. In addition, app developers can enhance their existing in-vehicle apps with additional functionality, and the new functionality will present properly on the HU screen without making any band-specific adjustments. This is not generally possible with MirrorLink using VNC.

In particular, user interface (UI) code may be sent to the HU to be rendered by a browser running on the HU. To support using the same interface code, the UE and the HU may both use the same syntax and semantics to render the UI code for presentation on a display, with the result that they both render the interface in the same way. In at least one embodiment, UI code that is presented on the UE display may be the same UI code that is transmitted to the HU for presentation on the HU display. Using this framework, app developers need not write any additional code for their apps to display properly on a display of a vehicle HU.

Figure 2:
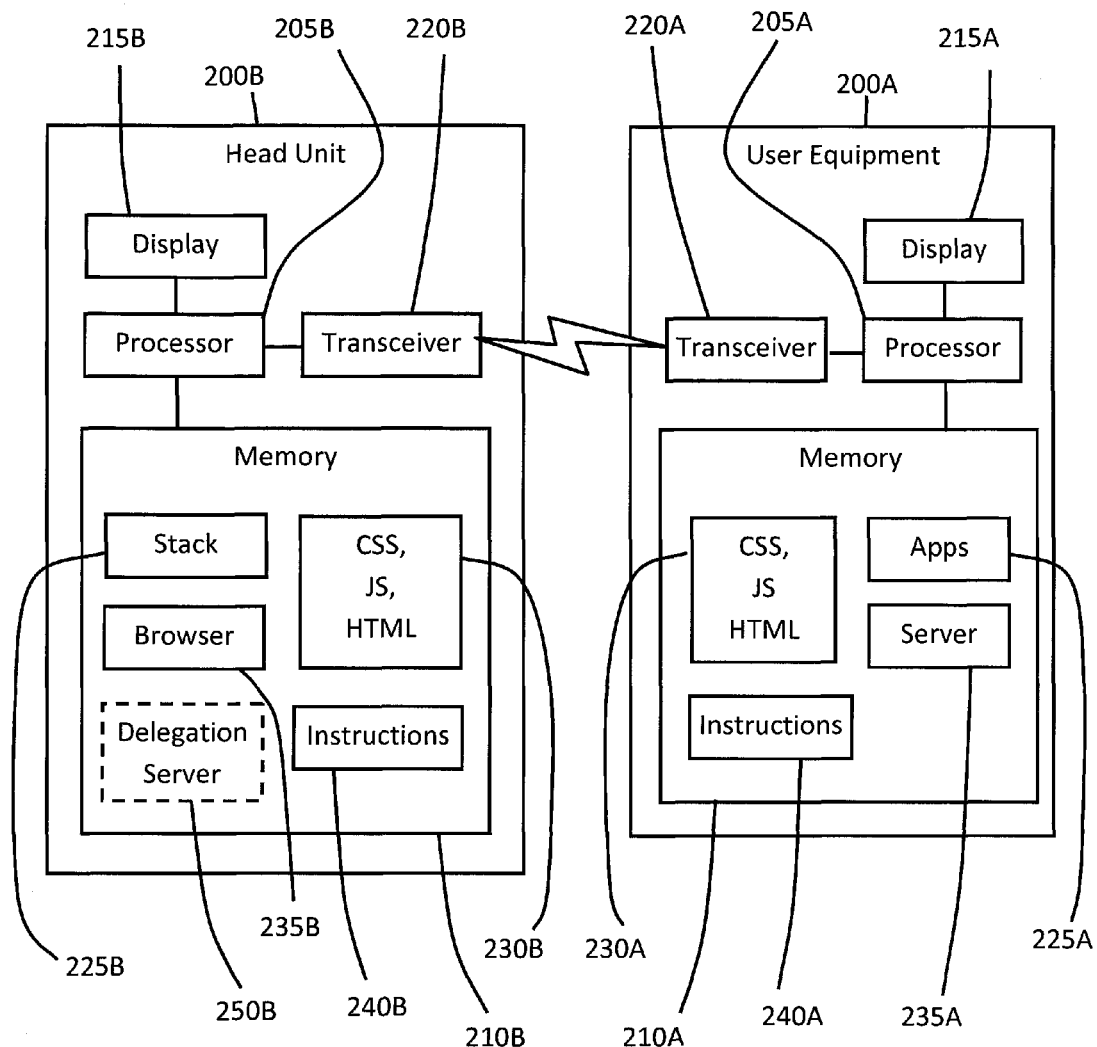
FIG. 2 is a block diagram of an exemplary embodiment of an HU and a UE in accordance with the disclosure.

FIG. 2 is a block diagram illustrating components of an exemplary embodiment. As shown, UE 200A communicates with vehicle components that may be contained in a single enclosure such as HU 200B. UE 200A includes a tangible processor 205A, coupled to a storage device such as memory 210A, as well as to a display device 215A, and to a transceiver 220A. Transceiver 220A may communicate via an air interface such as a WiFi, Bluetooth, or near field communications (NFC) interface. Alternatively, the transceiver may communicate using a wired interface, such as using a USB cable inserted into a port of the UE and a port of the vehicle, or by placing the UE into a docking station or cradle provided in the vehicle for that purpose.

UE memory 210A comprises operating software, such as an operating system like iOS, Android, Windows, Linux, etc. The memory also stores any number of installed apps 225A, including apps that a user may wish to use when driving. Such apps can include, for example, a mapping app that provides directions to a destination, or a social media app like Facebook, or a communications app such as Skype, for example.

Optionally, the apps may provide for presentation on the UE display of a graphical user interface (GUI) that is generated using user interface code 230A. Although any user interface code may be used that is able to generate a user interface appropriate for the app, in a currently disclosed embodiment the interface code includes industry standard mechanisms such as hypertext markup language version 5 (HTML5) and cascading style sheets (CSS). The app may also incorporate functions written in a scripting language such as JavaScript (JS), or that can be reproduced using JS. Memory 210A also includes server software 235A that can send the user interface code to the head unit via UE transceiver 220A. Memory 210A further includes instructions 240A for setting up communications with vehicle components, as will be described. In addition, the UE may include hardware and software (not shown) to support cellular communications, such as conventional cellular telephone calls and cellular data services Exemplary vehicle components are also illustrated in FIG. 2. As shown, the vehicle components may be contained in a single enclosure such as HU 200B, although other arrangements are possible and the components need not all be contained in a single enclosure. HU 200B comprises some components similar in general functionality to those described in connection with UE 200A, including processor 205B, memory 210B, display 215B, and transceiver 220B. The HU also includes a protocol stack 225B which is used in setting up communications with the UE, in accordance with instructions 240B, as will be described. User interface information may be received from the UE via transceiver 220B, to be rendered by browser 235B as a user interface that may be presented on display 215B. As noted in the description above in connection with UE 200A, although any appropriate user interface code may be used, in a currently disclosed embodiment the received interface code includes industry standard mechanisms such as HTML5. In embodiments, the memory can have stored therein at least one CSS previously provided by the vehicle or HU manufacturer, and designed to provide an app appearance that is characteristic of the vehicle brand or the HU brand. Alternatively or in addition, one or more CSSs can be included in the user interface code received from the UE. The interface code received from the UE may also include JS to implement certain app functionality.

The server in the UE and the browser in the HU communicate using internet protocol (IP). The browser running on the HU communicatively connects to the server running on the UE using a socket connection. The UE server can then serve the user interface code, including HTML5 code for example, to the HU browser. HU stack 225B includes MirrorLink protocols which tell the browser which IP address to use as an entry point. Because MirrorLink is IP-based and the UE and the HU communicate over socket connections, this architecture can be integrated with MirrorLink without altering pre-existing MirrorLink protocols.

To achieve a brand-specific look and feel, the user interface code received from the UE can be merged with HU-specific CSS and JavaScript files 230B already stored in the HU memory to present on the HU display an "HU-themed" or "vehicle brand-themed" version of the app running on the UE.

Web apps normally consist of several files that, in their source code, reference each other and/or other resources using relative path names. When a browser encounters such a reference, it typically requests the referenced file or other resource using an HTTP GET command, using the relative path name in relation to the host address currently opened. However, because such resources may not be native to the HU and may not have been transferred from the UE to the HU, the referenced resource may not be available on the HU. Therefore, in at least one embodiment, such resource requests may be redirected to the UE. In at least one embodiment, the redirection may be implemented by a browser customized to request the referenced resource from the UE instead of from the HU, which is the current host. In at least another embodiment, a delegation server 250B may be provided on the HU that may be used to delegate those requests to the UE. Optionally, use of delegation server 250B does not involve customizing the browser application, and thus does not adversely affect browser interchangeability and maintainability.

Figure 3:
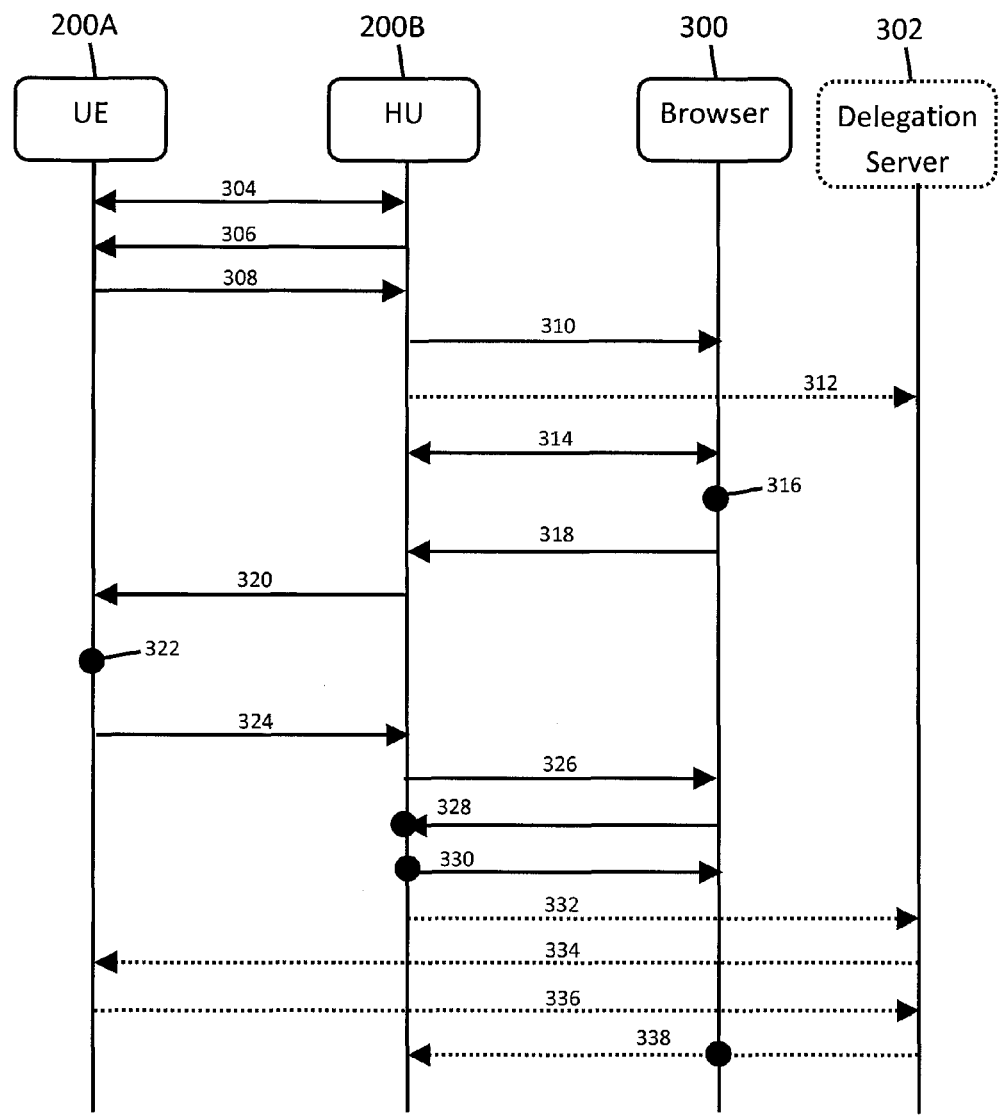
FIG. 3 is a flow chart illustrating exemplary operations in accordance with the disclosure.

The operation of an exemplary implementation is illustrated FIG. 3 in a sequence chart. The chart includes UE 200A and HU 200B, similar to the UE and HU of FIG. 2. In addition, FIG. 3 shows browser application 300 that runs on the HU, and optional delegation server 302 which, if included, also runs on the HU. The delegation server and operations involving it are shown using dotted lines to illustrate their optional nature.

Referring now to FIG. 3, illustrative operations begin with a standard MirrorLink handshake, 304, to establish a communication session between the UE and the HU. The HU then requests a list of the apps available on the UE that may be accessed by the HU, 306. In embodiments, the list of available apps can include, for example, only apps that have been approved for use while driving by the CCC, and/or by a car manufacturer, a regulatory body, or the like. An approval mechanism may have resulted in an indicator included with the app, such as a flag or the like in the app code, which identifies the app to the HU as having been approved for use during operation of a vehicle. The UE may respond to the request by providing a list of apps, 308. The list may be configurable and may include, for example, all apps installed on the UE, or a subset such as all approved apps, or a list of favorite apps, or a list of favorite approved apps, etc.

The HU also launches its browser application, 310. In an embodiment, the browser may be based on Chromium™, an open source web browser project related to the Google Chrome browser, although other browser applications may be used or developed for this purpose. Optionally, the HU may also launch a delegation server, 312. The HU browser obtains the app list provided by the UE and presents the list on the HU display, 314. For example, the list of apps may be presented as a plurality of icons on the display, such as icons 120B shown in the display of HU 110B in FIG. 1B. The user may select one of the displayed apps, 316, for example, by touching an app icon presented on a display touchscreen, or by operating a user control of the vehicle in accordance with the MirrorLink standard to select an app. In response, a Launch Application request with the app ID of the selected app may be sent, 318, from the browser via HU transceiver 220B to the UE, 320.

In response, the UE may start its web server, 322. Alternatively, the UE web server may have launched earlier, such as during or after the MirrorLink handshake 304. The UE then sends its web server URL to the HU, 324. In some embodiments, the UE may launch the selected app, update its own display to present the app's user interface, and send to the HU user interface information code (UI code), such as HTML5, CSS, and/or JS code, for example. The HU browser app may obtain the UI code and update the HU display to present a GUI based on the obtained UI code, 326. Optionally, the app running on the UE presents on the UE display a user interface generated using UI code, including for example HTML5, CSS, and/or JS compliant code or the like, and the same UI code may be sent to the HU, which received the UI code and forwards it to the browser. The browser then presents the app UI on the HU display based at least in part on the received UI code. Alternatively, if such code is not used by the UE to present the app interface, then a separate translator application (not shown) may be provided to generate UI code based on the app user interface data that is used by the UE to present the app interface on its display. The translator may run on the UE or on the HU, for example. Optionally, the user interface data or code sent to the HU corresponds to UE display updates as the app executes on the UE. Thereby, the resulting user interface presented on the HU display may correspond to the user interface presented on the UE display as the app runs on the UE and causes changes in the UE display.

In embodiments, at 324 in conjunction with its web server URL, the UE may also send to the HU some or all of the app code for the requested app, as well as the uniform resource identifier (URI) of one or more resources that may be used by the requested app when it runs. For example, if the app is written in an interpreted language such as JavaScript (JS) or the like, the UE may send some or all of the app's code to the HU. In that case, the HU may receive the app code and execute the app on its own processor 205B. The app running on the HU may then provide UI code to update its display, or alternatively the app may run in the browser application, 326. In an embodiment, the HU may optionally also send UI code generated thereon to the UE (not shown). The UE may then update its display based on the UI code received from the HU, thereby synchronizing the UE display with the HU display.

In either case (i.e., either the UE runs the app and sends UI code or info to the HU, or the UE sends app code to run directly on the HU), the HU receives the information sent by the UE, and may respond by accessing resources for its own use in presenting an app user interface on its display in a manner that has a look and feel that is characteristic of the HU brand or of the vehicle brand.

For example, operations performed at 326 may include, in an illustrative operation, the HU browser loading a pre-defined file that resides in its memory 230B. One example of such a file is the HTML code shown in FIG. 4A, which may be used in the case where the UE runs the app and sends to the HU only user interface information or UI code. Loading the HTML code of FIG. 4A enables the HU browser to request the two files referenced in the code's head-section (i.e., the two lines between the <head> and </head> tags). In the example shown, one of the two referenced files, called "css/brand.css", may contain one or more CSSs that may provide to the app UI displayed on the HU a look that is characteristic of a particular brand, such as a brand of the HU or of the vehicle. The other referenced file, "brand.js", may contain one or more JS scripts that may provide to the app a feel that is characteristic of the brand.

Another example of a pre-defined file is the HTML code shown in FIG. 4B, which may be used in the case where the UE sends app code the HU, and the app runs on the HU. Loading this HTML code enables the HU browser to request two additional files referenced in its head-section, called "css/app.css", and "app.js". The former may contain one or more CSSs used by the app to provide its native user interface on the HU. The latter may contain JS code included in the app that provides its native functionality. This arrangement facilitates the easy integration of brand-specific CSSs and JS with application-specific CSSs and JS.

Returning to FIG. 3, in the case where the app runs on the HU, the app may request a resource needed to perform a task, 328 (represented by the 328 large dot). IN the case where the app is running in the browser, then the browser may provide the request (represented by the 328 arrow). Because the paths to resources referenced in app code are relative, the resource request is resolved by the HU by looking first to its local file system. The address of a resource that is found locally is returned to the app, 330 (dot) or to the browser (arrow). But in the case of a requested resource that is not found locally, the request may optionally be forwarded to the delegation server, 332. The delegation server may then forward the request to the UE, 334, using the server URL. The UE may then locate and return the requested resource, or its address, to the delegation server on the HU, 336. The delegation server may then forward the resource or its address to the app (338 arrow) or browser (338 dot). Alternatively, the UE and HU may cooperate by the HU delegating computing tasks to the UE via the delegation server, and the UE performing the delegated tasks and returning the results to the HU in a distributed computing arrangement (not shown). In such an arrangement, the computing tasks delegated by the HU to the UE may, but need not, pertain to a resource that is not available locally to the HU. Instead, any appropriate criterion may be used by the HU to delegate tasks to the UE. For example, the HU may determine that it may obtain better application performance by delegating to the UE tasks that the UE can perform more quickly than the HU, perhaps because the processor of the UE is more capable and/or less heavily loaded than that of the HU.

In the prior art, MirrorLink compliant apps always run on the UE, and in order to access vehicle data the app makes calls to a vehicle application programming interface (API). In embodiments in which the app runs on the UE and sends to the HU only the UI code, that scheme may still be used. However, in embodiments of the present disclosure in which the app runs on the vehicle, such as on the HU processor, the app may not have direct access to the vehicle API because that arrangement is not contemplated or provided for by the prior art MirrorLink standard. In such embodiments, the app may instead access the vehicle API indirectly via the UE. A vehicle API call for vehicle data made by an app running on the HU may be handled similarly to a request for a resource that is not found locally. That is, the HU delegation server may translate the API call into a request for the vehicle data. The request may then be sent to the UE, which may access the requested vehicle data using the prior art vehicle API and MirrorLink capabilities, and return the vehicle data to the HU. Thereby, indirect access to the vehicle data may be provided to the app on the HU, via the UE.

In order to get an app MirrorLink™ certified, the app is submitted to a CCC facility for inspection. Optionally, a list of web services the application accesses is submitted along with unobfuscated app code so the reviewers can evaluate the app. However, some developers may be reluctant or unwilling to reveal their intellectual property in this manner. Furthermore, for MirrorLink certification requires that an app's communication links to URLs must use Hypertext Transfer Protocol Secure (HTTPS) to secure the connection to prevent so-called man-in-the-middle attacks. In embodiments of the present disclosure, these issues may be addressed and mitigated. For example, at runtime the HU delegation server can ensure that an app running on the HU accesses URLs using HTTPS, and/or accesses only MirrorLink compatible and/or approved web services. Accordingly, the app itself need not provide the HTTPS capability, thereby reducing the burden on the developer to port the app for MirrorLink compliance. Further, when an app update is published, in the prior art the app has to be re-reviewed as rigorously as if it were a new application. However, because the HTTPS and web services requirements may be enforced by the HU delegation server, the administrative burden of certifying app updates may be correspondingly reduced.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system for in-vehicle access of mobile device functions, the system comprising:
an in-vehicle user control and an in-vehicle head unit (HU), the in-vehicle user control being configured to control the function of the (HU)
wherein the HU-includes:
a graphical display device;
a transceiver configured to communicate with a mobile user equipment (UE) communication terminal;
a tangible processing unit (processor);
a non-transitory data storage device (memory) in data communication with the processor, on which is stored computer code which, when executed on the processor, implements:
a protocol stack (stack) configured to establish a communication session between the HU and the UE;
a browser application (browser) configured to receive hypertext markup language version 5 (HTML5) code and to generate and present, on the display, a graphical user interface (GUI) based on the received HTML5 code;
at least one cascading style sheet (CSS) that works in cooperation with the received HTML5 code to provide a characteristic look to the generated GUI; and
instructions which cause the HU to:
send a request to the UE via the transceiver for app data including at least one of HTML5 code and code in another programming language;
receive the requested app data via the transceiver; and
present on the display, via the browser application, a GUI generated using the received app data and the CSS,
wherein the protocol stack is integrated with the browser application, the app data received via the transceiver includes a list of apps installed on the UE, the HU is configured to display icons for the list of apps for selection by a user on the HU display, and
wherein, in response to selection of one of the listed apps by the user on the HU display, the UE launches a select one of the UE installed apps, the HU launches the browser on the HU, a web server is launched on the UE, and the HTML5 code for rendering the received app data in the HU generated GUI is sent to the HU to be rendered by the browser application running on the HU, wherein, the UE and the HU are both configured to use the same syntax and semantics to render the received app data in the generated GUI code for presentation on the display such that the GUI is rendered in the same way on the UE and HU, wherein computer code is stored in the memory that implements a delegation server, and wherein the delegation server requests, from the UE, a resource sought by the selected app, wherein the delegation server is configured to delegate tasks between the HU and the UE to obtain better app performance based on capability and load at the HU and the UE.

2. The system of claim 1, wherein the HU is configured to communicate with the UE independent of the delegation server.

3. A system for in-vehicle access of mobile device functions, comprising:

an in-vehicle user control and an in-vehicle head unit (HU), the in-vehicle user control being configured to control a function of the vehicle;

an in-vehicle graphical display device;

an in-vehicle transceiver configured to communicate with a mobile user equipment (UE) communication terminal;

an in-vehicle tangible processing unit (processor);

an in-vehicle non-transitory data storage device (memory) in data communication with the processor, on which is stored computer code which, when executed on the processor, implements:

a protocol stack (stack) configured to establish a communication session between the vehicle and the UE;

a HU browser application configured to receive user interface code via the in-vehicle transceiver and to generate and present on the display a graphical user interface (GUI) based at least in part on the received code; and instructions which cause the vehicle to:

discover the presence of the UE;

request and receive app data via the in-vehicle transceiver, the received app data including data indicating a list of apps installed on the UE, the HU being configured to display icons for the list of apps for selection by a user on the HU display;

in response to selection of one of the listed apps by the user on the HU display, the HU browser application generates the GUI and presents received app data in the GUI on the in-vehicle display based at least in part on user interface code received from the UE via the in-vehicle transceiver; and responsive to a manipulation of the user control, cause the app running on the UE to perform an operation, wherein the user interface code for rendering the GUI is sent to the processor via the in-vehicle transceiver to be rendered by the HU browser application, and wherein, the UE and the processor are both configured to use the same syntax and semantics to render the received app data in the generated GUI on the display such that the GUI is rendered in the same way on the UE and on the in-vehicle graphical display device; and wherein computer code is stored in the memory that implements a delegation server, wherein the delegation server requests, from the UE, a resource sought by the selected app, wherein the delegation server is configured to delegate tasks between the HU and the UE to obtain better app performance based on capability and load at the HU and the UE.

4. The system of claim 3, further comprising instructions stored in the memory that cause the vehicle to:

update the GUI presented on the display responsive to the performed app operation.

5. The system of claim 3, further comprising at least one cascading style sheet (CSS) stored in the memory and configured to cause the browser to present the GUI using predefined GUI elements that provide a characteristic look.

6. The system of claim 3, wherein the user interface data includes HTML5 compliant code.

7. The system of claim 3, wherein user interface data includes code in the another programming language.

8. The system of claim 7, wherein the code in the another programming language causes the GUI to operate using predefined functionality that provides a characteristic feel.

9. The system of claim 3, wherein the vehicle uses Universal Plug and Play (UPnP) in the discovering of the presence of the UE.

10. A vehicle that accesses functions of a proximate mobile device, comprising:

a user control configured to control a function of the vehicle;

a graphical display device;

a transceiver configured to communicate with a mobile user equipment (UE) communication terminal;

a tangible processing unit (processor);

a non-transitory data storage device (memory) in data communication with the processor, on which is stored computer code which, when executed on the processor, implements:

a protocol stack (stack) configured to establish a communication session between the vehicle and the UE;

a browser application configured to receive user interface code and to generate and present on the display a graphical user interface (GUI) based at least in part on the received code; and instructions which cause the vehicle to:

discover the presence of the UE;

request and receive app data from the UE including a list of apps installed on the UE;

display icons for the list of apps for selection by a user on the graphical display device;

in response to selection of one of the listed apps by the user on the graphical display device, the browser is launched and used to receive HTML5 code for rendering app data received from a web server launched on the UE, wherein the received app data is rendered in a generated GUI using the received HTML5 code wherein the user interface code for rendering the GUI is sent to the processor via the in-vehicle transceiver to be rendered by the browser application, and wherein, the UE and the processor are both configured to use the same syntax and semantics to render the received app data in the generated GUI in the same way on the UE and on the in-vehicle graphical display device, wherein computer code is stored in the memory that implements a delegation server, and wherein the delegation server requests, from the UE, a resource sought by the selected app, wherein the delegation server is configured to delegate tasks between the HU and the UE to obtain better app performance based on capability and load at the HU and the UE.

11. The vehicle of claim 10, wherein the HU is configured to communicate with the UE independent of the delegation server.

12. A method for in-vehicle accessing of mobile device functions, comprising:

communicatively coupling a vehicle to a UE via a transceiver of the vehicle;
obtaining by the vehicle a list of apps installed on the UE;
storing the list in a memory of the vehicle;
presenting the list in a GUI on a display of the vehicle;
in response to a user selecting an app from the list displayed on the vehicle GUI, launching a browser application on a processor of the vehicle and causing a web server on the UE to be launched;
receiving app data by the browser application on the vehicle, including HTML5 and code in another programming language;
accessing at least one CSS stored in the memory of the vehicle;
presenting on the display a GUI generated by the browser application of the vehicle based at least in part on the received code and the accessed CSS; and
executing the received code to implement at least one function of the select app,
wherein the code for rendering the GUI is sent to the processor via the transceiver to be rendered by the browser application, and wherein, the UE and the processor are both configured to use the same syntax and semantics to render the received app data in the generated GUI code for presentation on the display such that the GUI is rendered in the same way on the UE and on the display, and
wherein the app runs on the vehicle processor, and
wherein the method further comprises:
launching a delegation server on the vehicle processor; and
sending by the delegation server to the UE a request for a resource sought by the selected app
wherein the delegation server is configured to delegate tasks between the HU and the UE to obtain better app performance based on capability and load at the HU and the UE.

13. The method of claim 12, wherein the communicatively coupling includes establishing a communicative connection between the vehicle and the UE.

14. The method of claim 12, wherein the app data received by the browser was previously obtained by the vehicle from the UE, and further includes at least one CSS obtained from the UE.

15. The method of claim 12, further comprising obtaining access by the vehicle to the requested resource via the UE.

16. The method of claim 12, wherein the HU communicates with the UE independent of the delegation server.

* * * * *